April 21, 1925.
C. J. ULRICH
1,534,997
FRUIT CUTTER AND JUICE EXTRACTOR
Filed Sept. 24, 1923
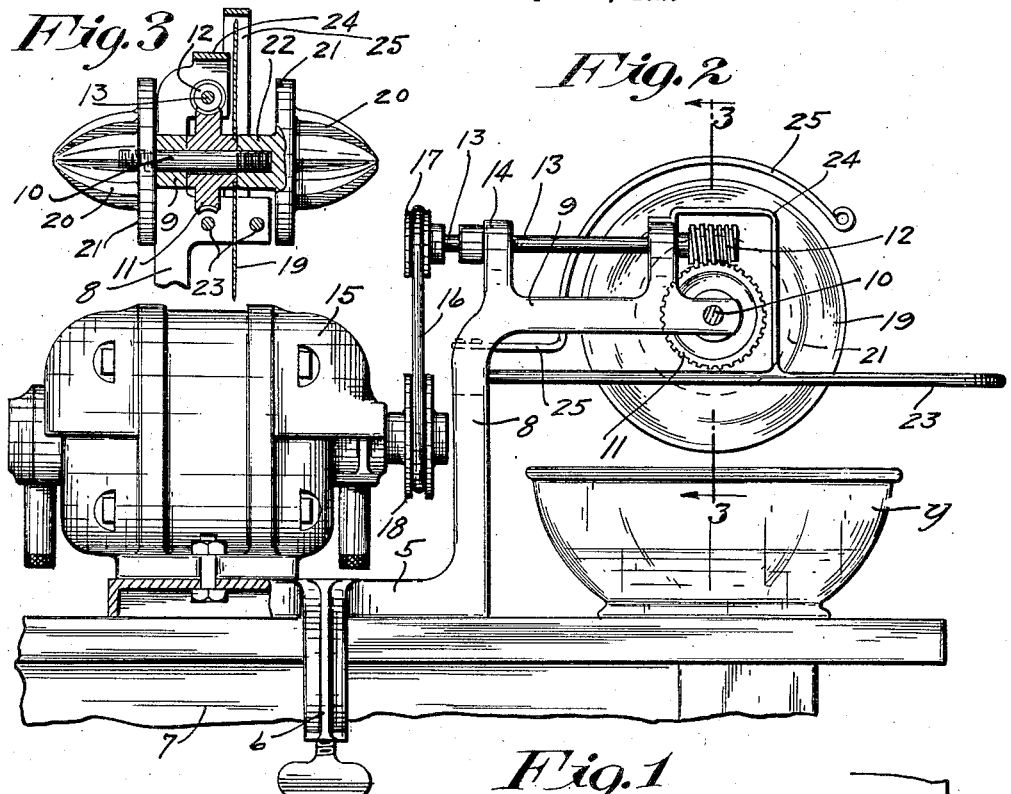
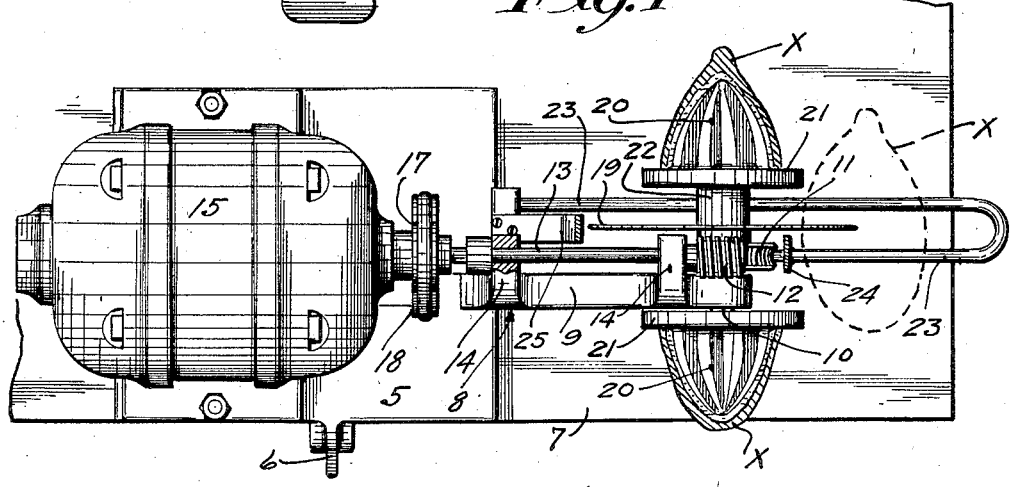
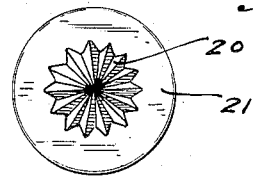
Inventor
Carl J. Ulrich
By his Attorneys
Merchant and Kilgore

Patented Apr. 21, 1925.

1,534,997

UNITED STATES PATENT OFFICE.

CARL J. ULRICH, OF MANKATO, MINNESOTA.

FRUIT CUTTER AND JUICE EXTRACTOR.

Application filed September 24, 1923. Serial No. 664,445.

*To all whom it may concern:*

Be it known that I, CARL J. ULRICH, a citizen of the United States, residing at Mankato, in the county of Blue Earth and State of Minnesota, have invented certain new and useful Improvements in Fruit Cutters and Juice Extractors; and I do hereby declare the following to be a full, clear, and exact description of the invention, such as will enable others skilled in the art to which it appertains to make and use the same.

My present invention has for its object to provide a self-contained fruit cutter and juice extractor that is extremely simple and highly efficient in its action.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the invention;

Fig. 2 is a side elevation of the same;

Fig. 3 is a detail view with some parts sectioned on the line 3—3 of Fig. 2; and Fig. 4 is an end elevation of one of the juice extractors.

The numeral 5 indicates a base having a clamp 6 for attaching the same to a table 7 or other support. Said base 5 is also provided at one end with a standard 8 having at its upper end a horizontal arm 9 which projects away from said base. Journaled on the arm 9 is a short transverse horizontal shaft 10. Keyed to the shaft 10, at one side of the arm 9, is a worm gear 11 which meshes with a worm 12 on one end of a horizontal countershaft 13 that extends parallel to and over the arm 9 and is journaled in bearings 14 formed therewith. This counter-shaft 13 is driven from an electric motor 15 on the base 5 by a belt 16 arranged to run over a relatively small grooved pulley 17 on said shaft and a relatively large grooved pulley 18 on the armature shaft of said motor.

A disk-like cutting blade 19 is mounted on the reduced end of one of the hubs of the worm gear 11 and is held thereon, as will presently appear. Mounted on the ends of the shaft 10 is a pair of juice extractors 20, secured thereto by screw threads. Each juice extractor 20 is in the form of a serrated cone having on its base an outstanding circumferential flange 21. The juice extractors 20 have their bases turned toward each other, and one of said juice extractors is held axially spaced from the cutting blade 19 by the arm 9 and worm gear 11, and the other of said juice extractors is provided with a hub 22 which holds the respective juice extractor axially spaced from the cutting blade 19. The hub 22 impinges against the cutting blade 19 and frictionally clamps the same onto the hub of the worm gear 11 so as to cause said cutting blade to rotate with the shaft 10 and the juice extractors 20.

For directing fruit to the cutting blade 19 there is provided a pair of laterally spaced horizontal guide rails 23 which extend parallel to and below the arm 9 and have their inner ends rigidly secured to the standard 8 and their outer ends are connected, the one with the other. The cutting blade 19 freely works between the guide rails 23, and to further support said guide rails, one thereof is connected to one of the bearings 14 by a flat inverted L-shaped bar 24 which also affords a guard for the worm gear 11 and worm 12 and a stop to limit the movement of the fruit on the guide rails 23 as the same is fed to the cutting blade 19. The cutting blade 19 is also provided with a guard 25 that is anchored to the standard 8.

The invention is especially adapted for cutting lemons, oranges and other citrous fruit and extracting the juice therefrom. In Fig. 1 there is indicated by broken lines a lemon *x* supported on the guide rails 23 in a position to be severed by the cutting blade 19; and in the same figure, the two halves of the severed lemon are indicated in section and positioned on the juice extractors 20.

To cut a lemon and extract the juice therefrom, the same is held at its ends by both hands of the operator and fed to the cutting blade 19 while positioned on the guide rails 23, and at the same time rotated to cause said cutting blades to completely sever the lemon. While the two halves of the lemon are still held in the hands of the operator, they are positioned against the outer ends of the juice extractors 20 and then pressed toward each other to feed the same onto said juice extractors, which, due to their revolving action, extract all of the juice from the two halves of the lemon.

A bowl or other receptacle *y* is supported on the table 7 to catch the juice as the same drips from the lemon while being severed by the cutting blade 19 and operated on by the juice extractors. By forming the guide rails 23 of two laterally spaced members with the cutting blade 19 working therebetween, the juice from the lemon being cut will drip therefrom without coming in contact with said guide rails; and the positions of the juice extractions 20 are such that the juice from the lemon will drip therefrom without coming in contact with any of the other parts of the apparatus.

The above described invention has, in actual usage, proven highly efficient for the purpose had in view. In addition to the time and labor saved by the use of said invention over the present "hand" method of cutting lemons and extracting the juice therefrom, the quantity of juice obtained is materially increased.

What I claim is:

1. The combination with a base having a standard provided with a horizontal arm projecting away from the base, of a motor on the base, a horizontal shaft journaled on and transversely of the arm, connections for driving the shaft from the motor, and a tool on the shaft arranged for action on fruit held thereagainst.

2. The structure defined in claim 1 in further combination with a clamp for attaching the base to a support.

3. The combination with a base having a standard provided with a horizontal arm projecting away from the base, of a motor on the base, a horizontal shaft journaled on and transversely of the arm, a pair of guide rails secured to the standard below the arm and extending forward of the arm, a suspending bar connecting the guide rails to the arm, and a cutting blade on the shaft and arranged to work between the guide rails.

4. The structure defined in claim 3 in which the suspending bar affords a stop to limit the movement of fruit on the guide rails as it is fed to the cutting blade.

In testimony whereof I affix my signature.

CARL J. ULRICH.